(12) United States Patent  
Seyfarth et al.

(10) Patent No.: US 6,474,568 B2
(45) Date of Patent: Nov. 5, 2002

(54) HEATABLE WASHER SYSTEM WHICH IS INTENDED FOR A MOTOR VEHICLE

(75) Inventors: Lutz Seyfarth, Meinhard (DE); Roland Sieber, Rotenburg (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/844,424

(22) Filed: Apr. 27, 2001

(65) Prior Publication Data

US 2001/0015385 A1 Aug. 23, 2001

Related U.S. Application Data

(62) Division of application No. 09/385,327, filed on Aug. 30, 1999, now Pat. No. 6,247,653.

(30) Foreign Application Priority Data

Sep. 4, 1998 (DE) .......................... 198 40 304

(51) Int. Cl.$^7$ ................................. B05B 1/10
(52) U.S. Cl. ................................. 239/284.1
(58) Field of Search ....................... 239/284.1

(56) References Cited

U.S. PATENT DOCUMENTS

| 3,352,353 | A | * | 11/1967 | Stevens et al. ...... 239/284.1 X |
| 3,888,412 | A | * | 6/1975 | Lindo .................. 239/284.1 X |
| 4,508,957 | A | * | 4/1985 | Rocchitelli ........... 239/284.1 X |
| 5,118,040 | A | * | 6/1992 | Abe ....................... 239/284.1 |
| 5,509,606 | A | * | 4/1996 | Breithaupt et al. ... 239/284.1 X |
| 5,927,608 | A | * | 7/1999 | Scorsiroli ............. 239/284.1 |
| 6,029,908 | A | * | 2/2000 | Petzoid ................. 239/284.1 |
| 6,032,324 | A | * | 3/2000 | Lansinger ............. 239/284.1 X |

FOREIGN PATENT DOCUMENTS

DE 4426179 1/1996

* cited by examiner

Primary Examiner—Lesley D. Morris
(74) Attorney, Agent, or Firm—Martin A. Farber

(57) ABSTRACT

In a washer system (9) which is intended for a motor vehicle, a delivery unit (1) is used to supply a washer nozzle (11) which is connected by means of a pipe element (10). To protect against damage at low ambient temperatures, a heating element (5) is arranged on a housing (7) of a pump chamber (3) of the delivery unit (1) and thus makes it possible for the washer fluid situated in the pump chamber (3) to be heated rapidly and in a specific manner.

4 Claims, 2 Drawing Sheets ated divisional application of our application Ser. No. 09/385,327 filed Aug. 30, 1999 UNDER 35 U.S.C. 120, now U.S. Pat. No. 6,247,653. The entire contents of which are incorporated by reference herein.

HEATABLE WASHER SYSTEM WHICH IS INTENDED FOR A MOTOR VEHICLE

RELATED APPLICATION

This is a continuing divisional application of our application Ser. No. 09/385,327 filed Aug. 30, 1999 UNDER 35 U.S.C. 120, now U.S. Pat. No. 6,247,653. The entire contents of which are incorporated by reference herein.

FIELD AND BACKGROUND OF THE INVENTION

The invention relates to a heatable washer system which is intended for a motor vehicle and has a delivery unit for washer fluid.

In modern motor vehicles, washer systems of this type are used above all for cleaning the windshield or a headlamp lens. For this purpose, the washer system has a washer nozzle by means of which the washer fluid is directed onto the glass as a finely concentrated washer fluid jet. The washer fluid jet thereby detaches the particles of dirt adhering to the glass and thus ensures an optimum cleaning action.

In order also to make satisfactory operation in winter possible, washer systems of this type are frequently designed such that they can be heated, so that a possible freezing up of the washer fluid in the washer system can be avoided. In particular, it is already known to heat the washer fluid pipe and the washer nozzle.

In the case of washer systems of the abovementioned type, it has proved to be disadvantageous that the heating of the washer fluid in the washer fluid pipe and in the region of the washer nozzle is insufficient to ensure a troublefree flow of washer fluid even at low ambient temperatures. The washer fluid flow can be impeded in particular by frozen particles of washer fluid, as a result of which the delivery power of the delivery unit is considerably impaired and damage to the delivery unit may be caused.

SUMMARY OF THE INVENTION

The invention is based on the problem of designing a washer system of the type mentioned at the beginning in such a manner that functional impairment of the delivery unit because of frozen washer fluid can largely be eliminated.

According to the invention, this problem is solved in that the delivery unit is designed such that it can be heated by means of a heating element. This is able to prevent the washer fluid from freezing up in the delivery unit. Sufficient delivery power is thereby ensured even at very low ambient temperatures and possible damage, caused by the frozen washer fluid expanding in the delivery unit, is prevented.

For this purpose, the delivery unit may be designed such that it can be heated as a whole. In contrast, a development of the invention is particularly favorable in which the delivery unit has a pump chamber which can be heated by means of the heating element. By this means, that region through which the washer fluid flows can be heated by means of the heating element in a specific manner. As a result, the required heating power can be set comparatively low with, at the same time, rapid heating of the washer fluid being made possible.

In this case, an embodiment is favorable in which the heating element can be heated by means of a cooling-water circuit of an internal combustion engine of the motor vehicle. By this means, the waste heat of the internal combustion engine can be used to heat the delivery unit. In the process, a substream of the cooling water heated by the internal combustion engine may, for example, be branched off and supplied to the heating element, which serves at the same time as a heat exchanger. In this case, an additional, electrical supply of energy is not required.

It is also particularly favorable if the washer system has a heatable washer fluid container for the washer fluid, and the heating element has a heat-exchange surface which is wetted by the washer fluid. In this case, the delivery unit is arranged, for example, in the interior of the washer fluid container and is at the same time heated by means of the washer fluid contained in the washer fluid container. As a result, only one heat-exchange surface needs to be provided for the heating element, the additional energy consumption being inconsiderable.

An embodiment of the invention is particularly advantageous in which the heating element can be heated electrically. By this means, the heating element can be operated irrespective of the operating state of the motor vehicle. In particular, sufficient heating power can be achieved thereby when the internal combustion engine is at a standstill. At the same time, simple control of the heating power, for example, with the aid of temperature sensors, is possible.

In this case, it is particularly favorable if the heating element is a resistance heating wire. The resistance heating wire can also be retro-fitted on the delivery unit without any problem. At the same time, the heating wire may also be adapted without difficulty to a complicated shape of the delivery unit and is, moreover, available cost-effectively with virtually any desired heating power.

It is also advantageous if the heating element is arranged on the periphery of the delivery unit. As a result, the heating power can be adapted in a simple manner, for example by the number of windings arranged radially around the periphery, to the heating power required for heating the washer fluid. At the same time, uniform heating of the delivery unit can be achieved via the periphery, so that material stresses owing to temperature differences, which may lead to damage to the delivery unit, are avoided.

A development of the invention is designed for this in a particularly simple manner, in which development the delivery unit has a housing which has a groove in which the heating element is inserted. The heating element can thereby be fitted without any problem and at the same time makes improved transfer of heat possible by bearing extensively against the boundary surfaces of the groove. A standard housing which is provided with a groove may also, for example, be used, the housing only being provided with the heating element if desired.

In this connection, it is favorable if the heating element is fixed on the delivery unit by means of a clip connection. This enables the outlay on installation to be considerably reduced, particularly with no tools of any kind being required. As a result, the heating element is also suitable for retrofitting on a delivery unit which is already present, as long as the delivery unit is appropriately prepared. The heating element may be designed for this, for example, as a hollow body which is merely pushed over the delivery unit.

The heating element may be supplied independently of further heating elements of the washer system by a central energy source. In contrast, it is particularly advantageous if the heating element can additionally be used also to heat a connected pipe element. By this means, the outlay on installation is further reduced, it being possible to ensure continuous heating of the entire washer fluid path. The use throughout of a single heating element at the same time reduces possible sources of error and thus ensures trouble-free functioning of the washer system.

BRIEF DESCRIPTION OF THE DRAWINGS

The invention permits various embodiments. To further clarify its basic principle one of these is represented in the drawing and is described below. In the drawing

DETAILED DESCRIPTION OF THE PREFERRED EMBODIMENT

Figure 1:
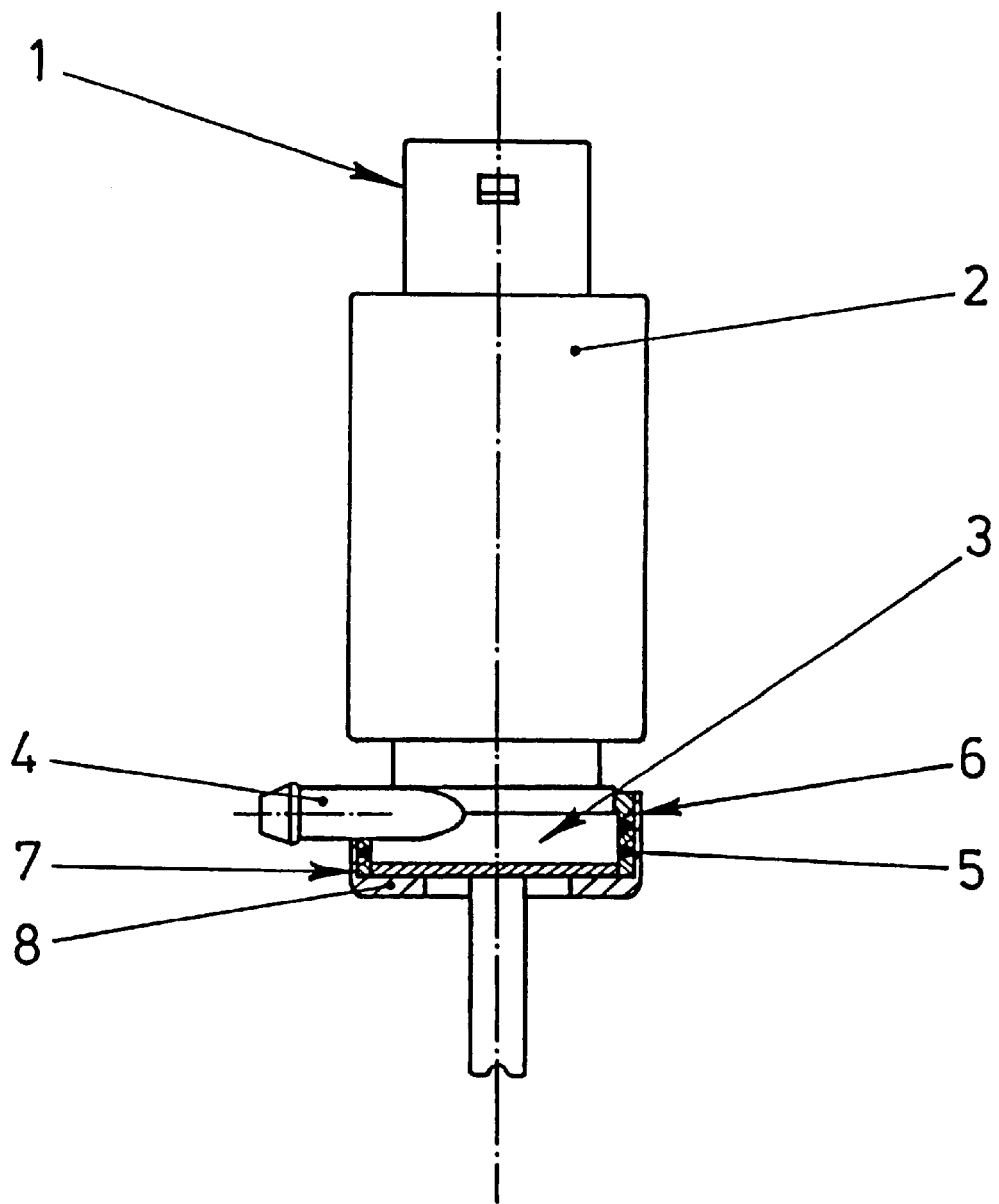
FIG. 1 shows a partially cut away plan view of a delivery unit.

FIG. 1 shows a partially cut away representation of a delivery unit 1 in a plan view. The delivery unit 1 has a drive 2 and a pump chamber 3 having a pump outlet 4. The pump chamber 3 furthermore has a heating element 5 which is arranged on the outside on the periphery and is designed as a heating wire and which is inserted in a corresponding groove 6 in a housing 7 of the pump chamber 3. The heating element 5 is fixed in its shown position on the housing 7 by means of a clip connection 8 which is designed as a sleeve. The washer fluid entering into the pump chamber 3 is heated by means of the heating element 5 and thus prevents a possible freezing up of the washer fluid.

Figure 2:
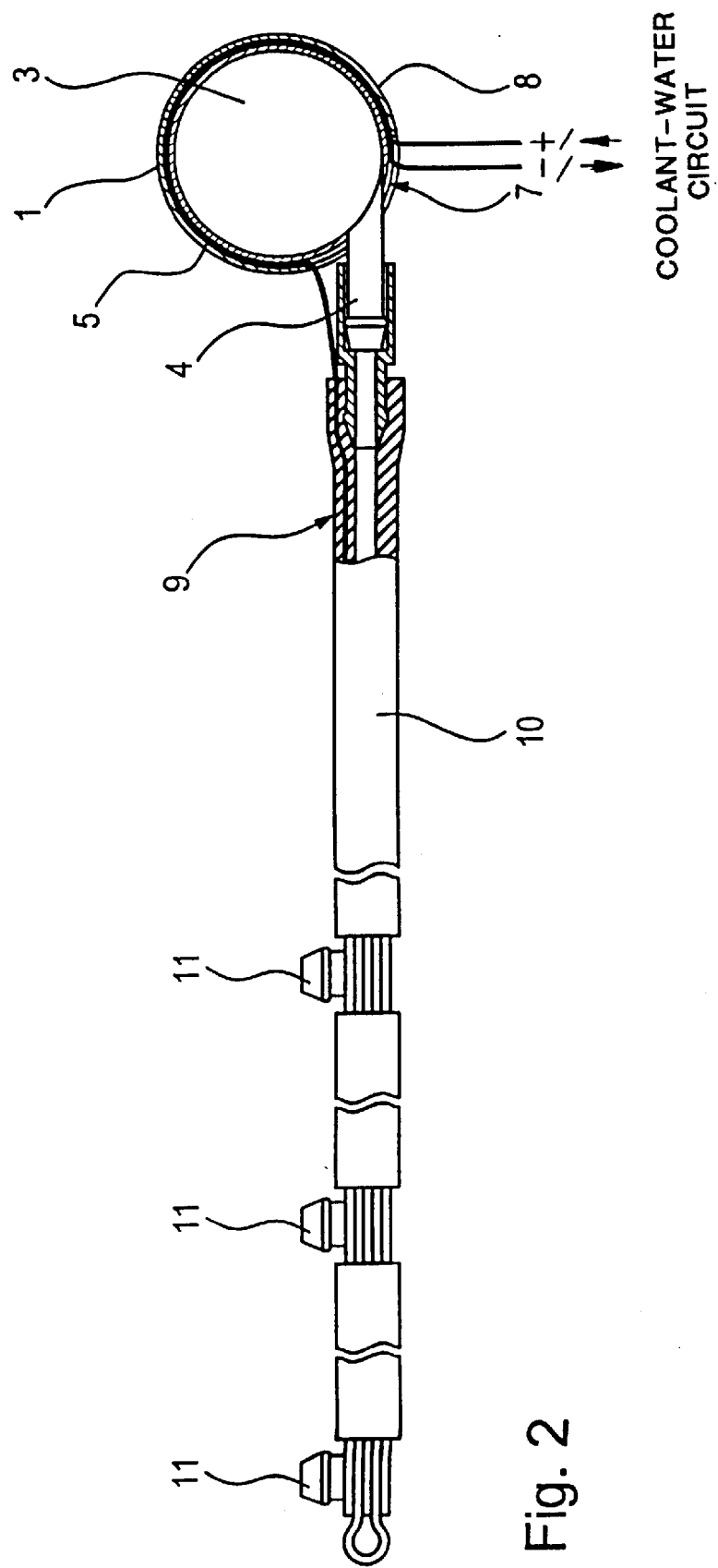
FIG. 2 shows a partially cut away front view of a washer system having the delivery unit shown in FIG. 1.

FIG. 2 shows a partially cut away representation of a washer system 9 having the delivery unit 1 shown in FIG. 1, in a front view. The housing 7 of the pump chamber 3 with the heating element 5 arranged on the periphery of the housing 7 can be seen. The heating element 5 is fixed on the housing 7 by means of the clip connection 8 which is designed as a sleeve, the clip connection 8 at the same time also being used to insulate the heating element 5 against losses of heat to the surroundings. The pump outlet 4 is connected to a pipe element 10 which serves to supply a plurality of washer nozzles 11. In the embodiment shown, the heating element 5 is used both for heating the delivery unit 1 and also the pipe element 10, so that heating throughout and therefore high operational reliability can be achieved.

What is claimed is:

1. A heatable washer system which is intended for a motor vehicle and comprises a heating element, a container for washer fluid, and a delivery unit for washer fluid, the heating element conducting heated water, and the delivery unit comprising a plurality of nozzles and a pipe located outside the washer-fluid container, the pipe communicating between the nozzles and the washer-fluid container, wherein the delivery unit is heated by means of the heated water of the heating element, the delivery unit has a pump chamber which is in contact with the heating element, and the heating element conducts the heated water along a surface of the pump chamber and a surface of the pipe of the delivery unit.

2. The washer system as claimed in claim 1, wherein the heating element receives heat from a cooling-water circuit of an internal combustion engine of the motor vehicle.

3. The washer system as claimed in claim 1, wherein the washer system further comprises a heatable container for the washer fluid, and the heating element has a heat-exchange surface which is wetted by the washer fluid.

4. The washer system as claimed in claim 1, wherein the pump chamber is encircled by the heating element.

* * * * *